US009842561B2

(12) United States Patent
Lee et al.

(10) Patent No.: US 9,842,561 B2
(45) Date of Patent: Dec. 12, 2017

(54) DISPLAY DEVICE

(71) Applicant: Samsung Display Co., Ltd., Yongin-si (KR)

(72) Inventors: Yongsoon Lee, Asan-si (KR); Sang-Gon Lee, Daejeon (KR); Yong-Sik Hwang, Yongin-si (KR)

(73) Assignee: Samsung Display Co., Ltd, Yongin-si (KR)

( * ) Notice: Subject to any disclaimer, the term of this patent is extended or adjusted under 35 U.S.C. 154(b) by 69 days.

(21) Appl. No.: 14/854,735

(22) Filed: Sep. 15, 2015

(65) Prior Publication Data

US 2016/0155374 A1 Jun. 2, 2016

(30) Foreign Application Priority Data

Dec. 2, 2014 (KR) ........................ 10-2014-0170671

(51) Int. Cl.
*G09G 3/20* (2006.01)
*G06F 3/14* (2006.01)
*G09G 3/36* (2006.01)

(52) U.S. Cl.
CPC ......... *G09G 3/3696* (2013.01); *G09G 3/3688* (2013.01); *G09G 2310/0291* (2013.01)

(58) Field of Classification Search
None
See application file for complete search history.

(56) References Cited

U.S. PATENT DOCUMENTS 8,164,587 B2 * 4/2012 Chang ................. H02M 5/4585 345/204
2008/0303767 A1 * 12/2008 Ludden ................ G09G 3/3688 345/89
2014/0053256 A1 2/2014 Soffer et al.

FOREIGN PATENT DOCUMENTS

KR 10-2009-0095912 9/2009
KR 10-2011-0072116 6/2011
KR 10-2012-0059351 6/2012

* cited by examiner

*Primary Examiner* — Joseph Haley
*Assistant Examiner* — Emily Frank
(74) *Attorney, Agent, or Firm* — H.C. Park & Associates, PLC

(57) ABSTRACT

A display device includes a voltage generating unit configured to convert an input voltage into an analog driving voltage, a controller configured to receive input image data and an image control signal and generate custom image data and a data control signal, a source driving unit configured to receive the analog driving voltage and convert the custom image data into data voltages in response to the data control signal, a sensing unit configured to sense a load current, wherein the sensing unit is connected to one point on a path through which the input voltage is converted into the analog driving voltage to be provided to the source driving unit, and a display panel configured to receive the data voltages to display an image. The controller receives the sensed load current and generates a selection signal according to a first intensity of the load current.

15 Claims, 7 Drawing Sheets

DISPLAY DEVICE

CROSS-REFERENCE TO RELATED APPLICATION

This application claims priority from and the benefit of Korean Patent Application No. 10-2014-0170671, filed on Dec. 2, 2014, which is hereby incorporated by reference for all purposes as if fully set forth herein.

BACKGROUND

Field

Exemplary embodiments relate to a display device. More particularly, exemplary embodiments relate to a display device capable of reducing power consumption.

Discussion of the Background

Typically, a display device includes a display panel and a driving unit for driving the display panel. The driving unit generates a control signal for driving the display panel and transmits to the display panel the generated control signal together with an image signal received from an external source to drive the display device.

Images displayed on a display panel are largely divided into still images and moving images. The display panel represents several frames per second. When image data included in each frame is identical to each other, still images are displayed. When the image data included in each frame is different from each other, moving images are displayed.

Unfortunately, display devices typically consume power unnecessarily when displaying still and moving images. Even though a display device consumes less energy when displaying a still image compared to displaying a moving image, it is still desirable to have a display device that consumes less power when displaying a still image than typical display devices.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device capable of reducing power consumption.

Additional aspects will be set forth in the detailed description which follows, and, in part, will be apparent from the disclosure, or may be learned by practice of the inventive concept.

An exemplary embodiment discloses a display device including a voltage generating unit configured to convert an input voltage into an analog driving voltage, a controller configured to receive input image data and an image control signal and generate custom image data and a data control signal, a source driving unit configured to receive the analog driving voltage and convert the custom image data into data voltages in response to the data control signal, a sensing unit configured to sense a load current, wherein the sensing unit is connected to one point on a path through which the input voltage is converted into the analog driving voltage to be provided to the source driving unit, and a display panel configured to receive the data voltages to display an image. The controller receives the sensed load current and generates a selection signal according to a first intensity of the load current.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
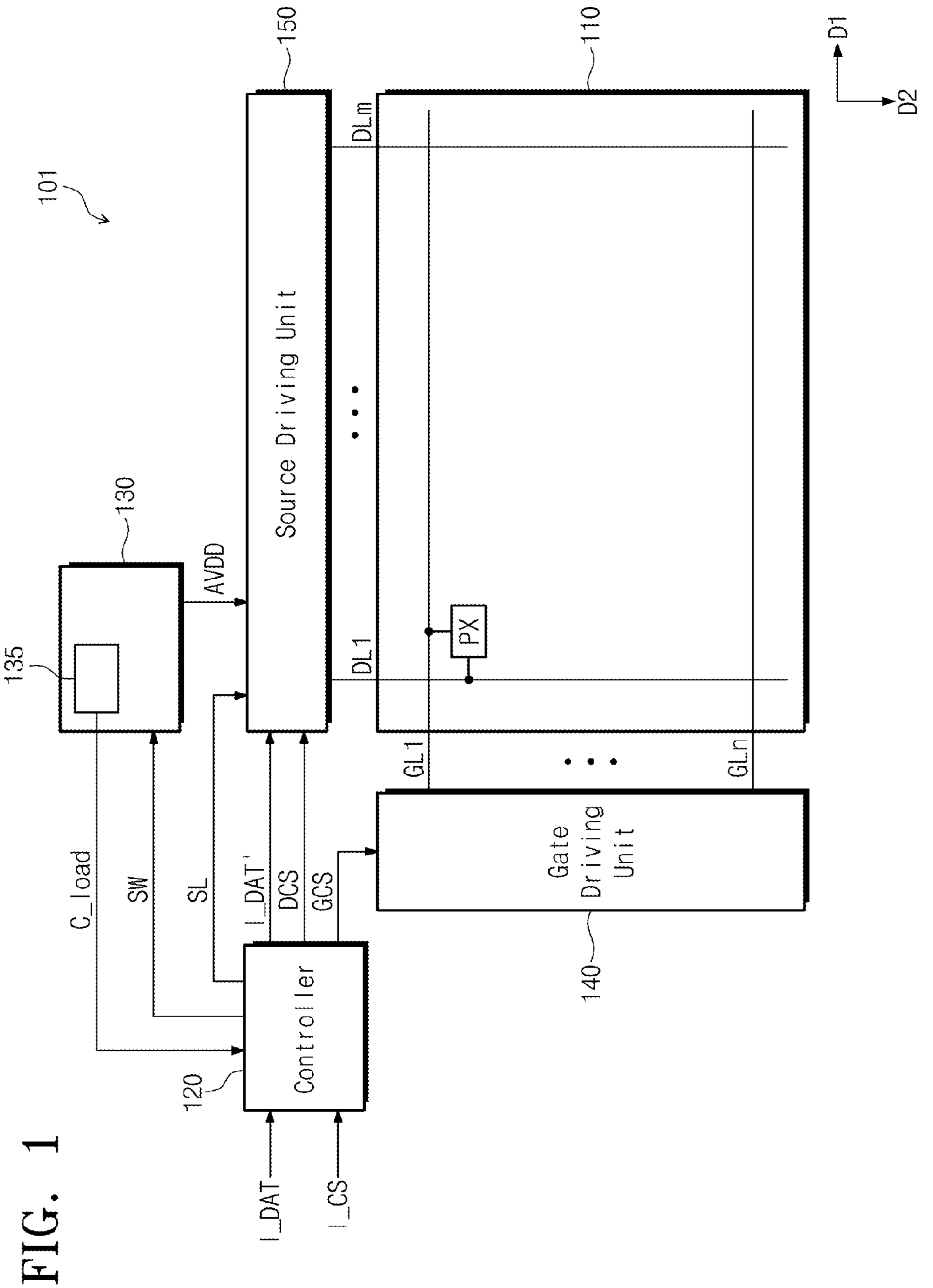
FIG. 1 is a block diagram of a display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
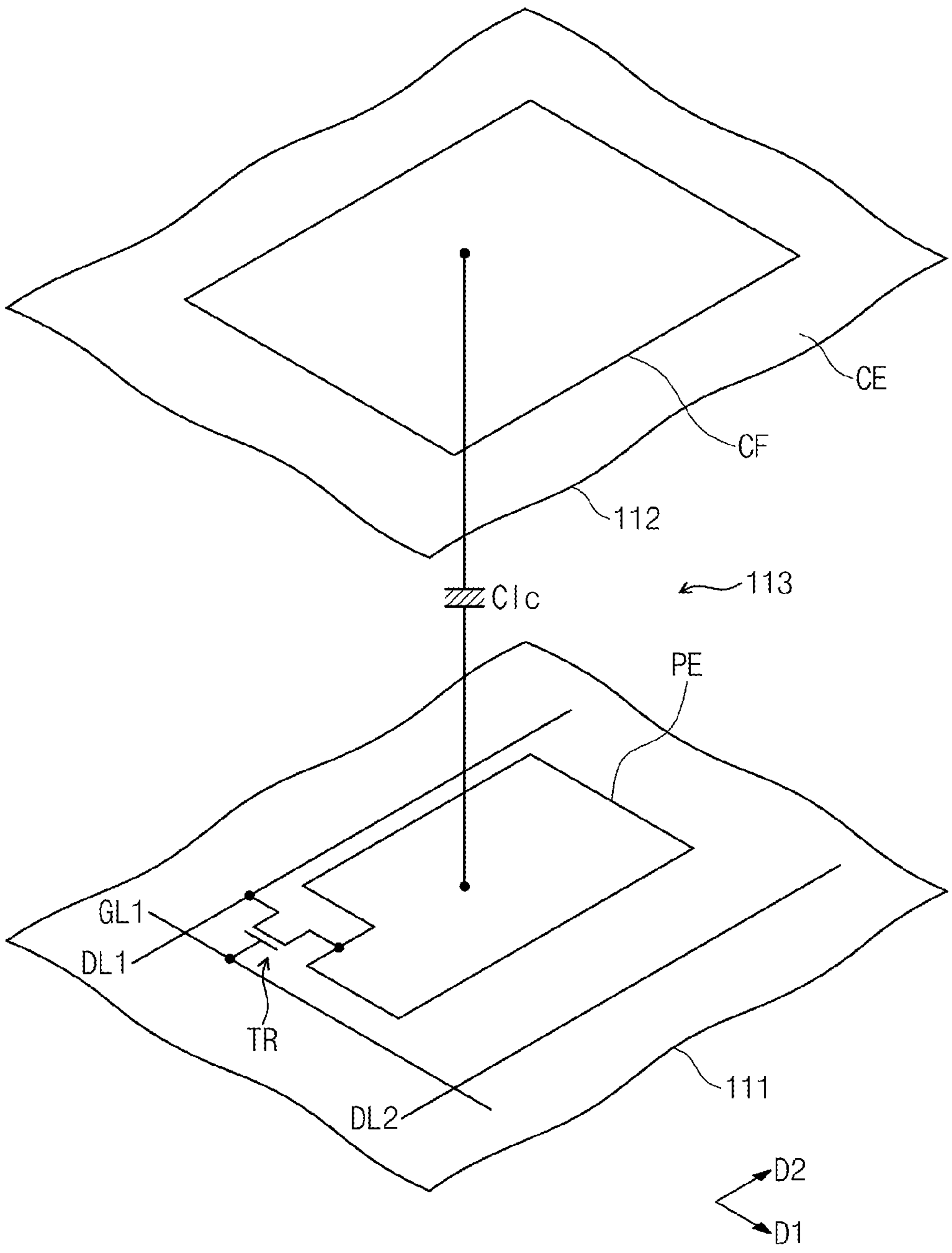
FIG. 2 is an equivalent circuit diagram of one pixel illustrated in FIG. 1.

FIG. 1 is a plan view of a display device according to an exemplary embodiment. FIG. 2 is an equivalent diagram of a pixel illustrated in FIG. 1.

Referring to FIGS. 1 and 2, a display device 101 according to an exemplary embodiment includes a display panel 110, a controller 120, a voltage generating unit 130, a gate driving unit 140, and a source driving unit 150.

The display panel 110 includes a first substrate 111, a second substrate 112 facing and coupled to the first substrate 111, and a gray control layer 113 disposed between the first and second substrates 111 and 112 to control light transmittance. In an exemplary embodiment, the display panel 110 may be a liquid crystal display panel including a liquid crystal layer as the gray control layer 113. In an alternate exemplary embodiment, the display panel 110 may employ another display panel using an organic electroluminescent device or an electrophoretic device.

Although not illustrated in the drawing, when the display panel 110 includes the liquid crystal display panel, the display device 101 may further include a backlight unit disposed on the rear surface of the display panel 110. The backlight unit is disposed on the rear surface of the display panel 110 to generate light. The backlight unit may use a light emitting diode, a cold cathode fluorescent lamp, or the like as a light source.

The display panel 110 includes gate lines GL1 to GLn, data lines DL1 to DLm, and pixels PX. In detail, the plurality of gate lines GL1 to GLn are extended in a first direction D1 and arranged in a second direction D2 which is substantially perpendicular to the first direction D1. The data lines DL1 to DLm are extended in the second direction D2 and arranged in the first direction D1. The data lines DL1 to DLm and the gate lines GL1 to GLn are disposed in different layers and intersect to be electrically insulated from each other.

Pixel regions are defined by the gate lines GL1 to GLn and the data lines DL1 to DLm. The pixels PX are respectively disposed on the pixel regions and each of the pixels PX includes a thin film transistor TR and a liquid crystal capacitor Clc. The liquid crystal capacitor Clc includes a first electrode PE and a second electrode CE, and the liquid crystal layer 113 is disposed between the first and second electrodes PE and CE.

As an exemplary embodiment, the gate lines GL1 to GLn, the data lines DL1 to DLm, the thin film transistor TR of each pixel PX, and a pixel electrode, which is the first electrode PE of the liquid crystal capacitor Clc, may be disposed on the first substrate 111. A common electrode, which is the second electrode CE of the liquid crystal capacitor Clc, may be disposed on the second substrate 112.

Pixel electrodes PE are provided on the first substrate 111. The pixel electrodes PE are disposed in one-to-one correspondence to the pixels PX. Each of the pixel electrodes PE receives a data voltage through a corresponding thin film transistor TR. The common electrode CE may be integrally formed as a single unitary and indivisible unit over an entire surface of the second base substrate 112 to face the plurality of pixel electrodes PE. A common voltage may be applied to the common electrode CE. An electric field is formed by a potential difference between the data voltage and the common voltage between each of the pixel electrodes PE and the common electrode CE. The liquid crystal layer 113 may control the light transmittance according to the intensity of the electric field.

Referring to FIG. 1, the controller 120 receives input image data I_DAT and an image control signal I_CS from an external image board (not illustrated). The input image data I_DAT may be defined as an image data signal input to the display device 101 from the outside the display device 101.

The controller 120 converts the input image data I_DAT to be matched with the specifications of the source driving unit 150. The converted image data I_DAT', or custom image data, is generated by the controller 120 and provided to the source driving unit 150.

The controller 120 creates a gate control signal GCS and a data control signal DCS in response to the image control signal I_CS. The controller 120 provides the gate control signal GCS to the gate driving unit 140, and the data control signal DCS to the source driving unit 150. The gate driving unit 140 creates a gate signal in response to the gate control signal GCS and sequentially outputs the gate signal to the gate lines GL1 to GLn. The gate driving unit 140 may be directly disposed on the first substrate 111 through a thin film process for forming thin film transistors TR of the pixels PX on the first substrate 111.

The source driving unit 150 receives the custom image data I_DAT' and the data control signal DCS from the controller 120 and converts the custom image data I_DAT' into data voltages to output the data voltages to the display panel 110 in response to the data control signal DCS. The data voltages may include positive polarity data voltages having positive values with respect to the common voltage and negative polarity data voltages having negative values with respect to the common voltage.

The polarity of the data voltage applied to the pixels PX may be inverted when a current frame ends and before a next frame starts in order to prevent degradation of liquid crystals. In other words, the polarity of the data voltage may be inverted in a unit of one frame in response to an inversion signal applied to the source driving unit 150. The display panel 110 may be driven in a scheme that data voltages of different polarities are applied in a unit of at least one data line for improving display quality when one frame image is displayed.

The source driving unit 150 may be formed in a chip type (hereinafter, "a driving chip") to be mounted on the first substrate 111 of the display panel 110, or attached on a film (not illustrated) attached to one side of the display panel 110. The number of the driving chips may differ depending on the size or resolution of the display panel 110.

Figure 3:
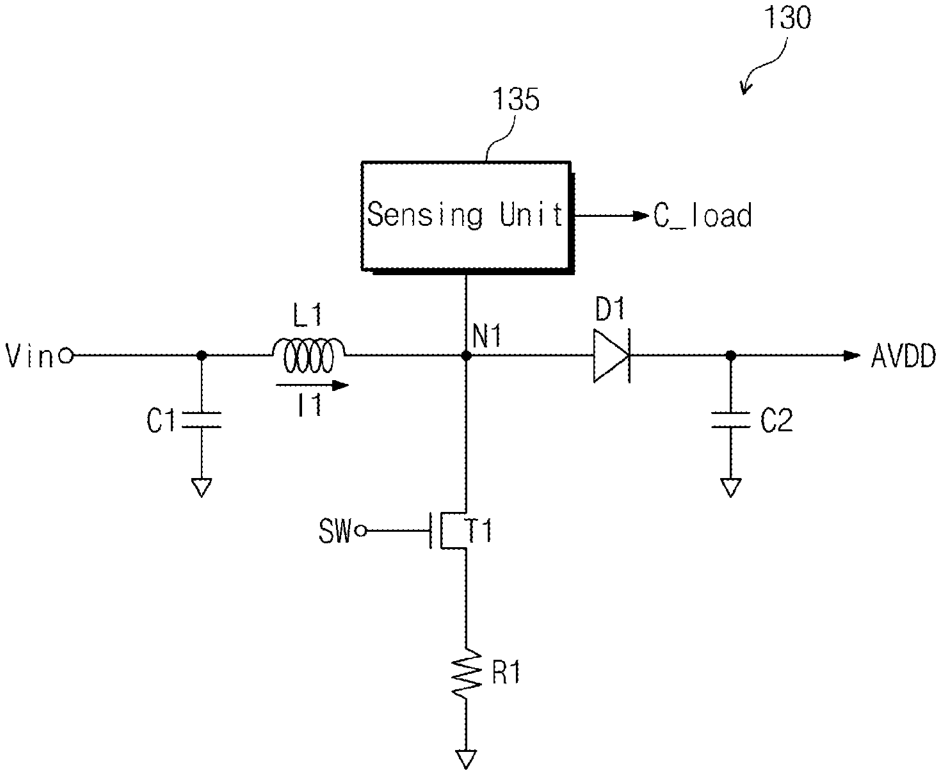
FIG. 3 is an internal circuit diagram of the PM_IC illustrated in FIG. 1.

As illustrated in FIG. 3, the voltage generating unit 130 receives an input voltage Vin from the outside of the display device 101 (not shown) and converts the input voltage Vin into an analog driving voltage AVDD on the basis of a pulse width modulation signal. The analog driving voltage AVDD generated by the voltage generating unit 130 is applied to the source driving unit 150.

The display device 101 is connected to any one point on a path through which the input voltage Vin is converted into the analog driving voltage AVDD to be provided to the source driving unit 150 and includes a sensing unit 135 sensing a load current C_load. In an exemplary embodiment, the voltage generating unit 130 is formed in a chip type (hereinafter a power management integrated circuit referred to as a "PM_IC") and the sensing unit 135 may be built into the PM_IC 130.

The sensing unit 135 transmits the sensed load current C_load to the controller 120. The load current C_load may be converted into a digital signal by the sensing unit 135 to be transmitted to the controller 120. The controller 120 generates a selection signal SL based on the load current C_load. The controller 120 provides the generated selection signal SL to the source driving unit 150. The selection signal SL is a signal for controlling a bias current to be described later.

FIG. 3 is an internal circuit diagram of the PM_IC 130 illustrated in FIG. 1.

Referring to FIG. 3, the PM_IC 130 may include a coil L1, a diode D1, first and second capacitors C1 and C2, and a transistor T1. One end of the coil L1 is connected to an input terminal through which the input voltage Vin is applied. The other end of the coil L1 is connected to a first node N1. The diode D1 includes an anode connected to the first node N1 and a cathode connected to an output terminal through which the analog driving voltage AVDD is output. The transistor T1 includes a gate receiving a switching signal SW from the controller 120 (see FIG. 1), a drain connected to the first node N1, and a source connected to a ground terminal through a first resistor R1. The first capacitor C1 is connected between the input terminal of the PM_IC 130 and the ground terminal. The second capacitor C2 is connected between the output terminal thereof and the ground terminal.

Turning on/off of the transistor T1 is adjusted according to a signal level of the switching signal SW output from the controller 120. More specifically, when the switching signal SW is in a high level, the transistor T1 is turned on. When the transistor T1 is turned on, a current path is generated from the input voltage Vin to the ground terminal connected to the first resistor R1. In this case a current I1 flowing through the coil L1 is gradually increased in proportion to the input voltage Vin applied to both ends of the coil L1 according to current and voltage characteristics of the coil L1. On the other hand, when the switching signal SW is in a low level, the transistor T1 is turned off. When the transistor T1 is turned off, a current path is generated from the input voltage Vin to the output terminal through which the analog driving voltage AVDD is output. In this case the current I1 flowing through the coil L1 flows through the diode D1 and a voltage is charged to the second capacitor C2 according to current and voltage characteristics of the second capacitor C2. Accordingly, the input voltage Vin is boosted to a certain voltage to be output as the analog driving voltage AVDD.

The current corresponding to the analog driving voltage AVDD may vary according to the load (e.g. power consumed by the source driving unit). In other words, the load current C_load sensed by sensing unit 135 may be varied according to the load. For example, when the display device 101 draws low power for driving the display panel 101, the level of the sensed load current C_load may be low.

The sensing unit 135 may be connected to the first node N1 of the PM_IC 130 and sense the load current C_load as one index indicating power consumed by the source driving unit 150 during operation of the display device 101.

The sensing unit 135 converts the sensed load current C_load into a digital signal and transmits the digital signal of the sensed load current C_load to the controller 120. The controller 120 creates the selection signal SL based on the digital load current C_load.

Figure 4:
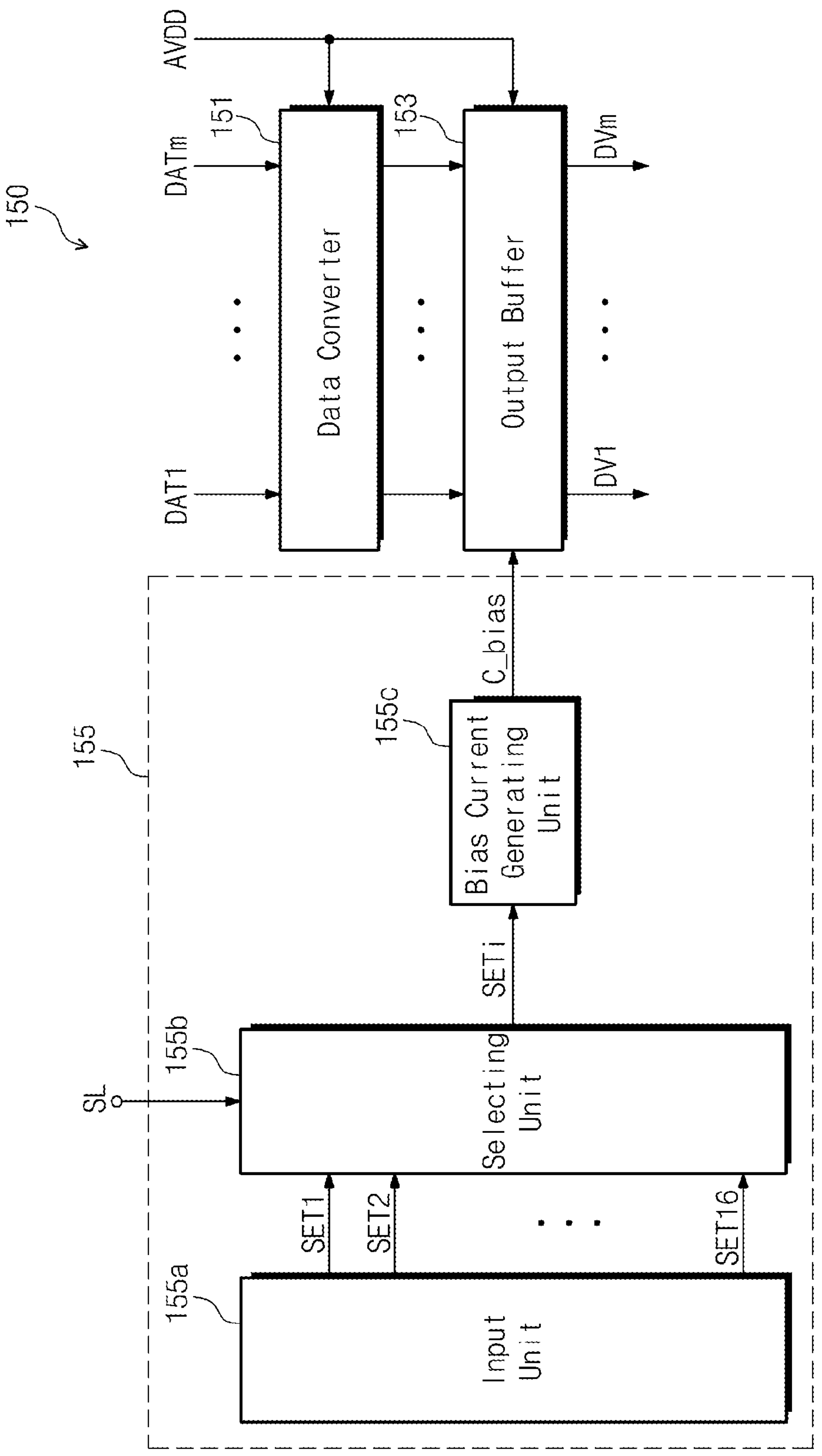
FIG. 4 is an internal block diagram of the source driving unit illustrated in FIG. 1.

FIG. 4 is an internal block diagram of the source driving unit illustrated in FIG. 1.

Referring to FIG. 4, the source driving unit 150 includes functional blocks that convert the input image data I_DAT' input from the controller 120 into digital voltages. The functional blocks may be largely divided into digital processing blocks and analog processing blocks. For brevity, FIG. 4 illustrates only a data converter 151 and an output buffer 153 among functional blocks included in the analog processing blocks. The data converter 151 receives one line amount of image data DAT1 to DATm among the input image data I_DAT' and converts the image data DAT1 to DATm into one line amount of data voltages DV1 to DVm on the basis of gamma voltages received from a gamma voltage generating unit (not illustrated).

The data voltages DV1 to DVm are provided to the display panel 110 through the output buffer 153. The output buffer 153 stores the data voltages DV1 to DVm for a predetermined time and allows the data voltages DV1 to DVm to be simultaneously output to the display panel 110.

The source driving unit 150 further includes a bias current controller 155. The bias current controller 155 includes an input unit 155*a* configured to receive bias current control signals, a selecting unit 155*b* configured to select one SETi of the bias current control signals SET1 to SET16 from input unit 155*a*, and a bias current generating unit 155*c* configured to generate the bias current C_bias based on the selected bias current control signal SETi.

Each of the bias current control signals SET1 to SET16 may be an n bit signal. More specifically, the number of the bias current control signals SET1 to SET16 may be $2^n$. As an example of the inventive concept, each of the plurality of bias current control signals SET1 to SET16 is formed of a 4 bit signal and then 16 bias current control signals (hereinafter, "first to sixteenth bias current control signals SET1 to SET16") are input to the input unit 155*a*. The first to sixteenth bias current control signals SET1 to SET16 may be signals provided from the controller 120.

Load currents respectively corresponding to the first to sixteenth bias current control signals SET1 to SET16 may be preset in the controller 120. Accordingly, the controller 120 creates the selection signal SL for selecting a corresponding bias current control signal SETi from among the first to sixteenth bias current control signals SET1 to SET16 according to the load current C_load provided from the sensing unit 135. The controller 120 provides the selection signal SL to the selecting unit 155*b*. The selecting unit 155*b* selects one of the first to sixteenth bias current control signals SET1 to SET16 in response to the selection signal SL. The selecting unit 155*b* provides the selected bias current control signal SETi to the bias current generating unit 155*c*.

The bias current generating unit 155*c* adjusts the intensity of the bias current C_Bias according to the selected bias current control signal SETi in order to provide the bias current C_Bias to the output buffer 153. For example, when the display device 101 is drivable with low power consumption (i.e., the level of the sensed load current C_load is low), the controller may determine a state of the selection signal SL to allow bias current control signals having smaller intensities of corresponding bias current C_Bias to be selected from among the first to sixteenth bias current control signals SET1 to SET16 as shown in Table 1.

TABLE 1

| | I_Bias (μA) |
|---|---|
| SET1(0000) | 1.00 |
| SET2(0001) | 1.25 |
| SET3(0010) | 1.50 |
| SET4(0011) | 1.75 |
| SET5(0100) | 2.00 |
| SET6(0101) | 2.25 |
| SET7(0110) | 2.50 |
| SET8(0111) | 2.75 |
| SET9(1000) | 3.00 |
| SET10(1001) | 3.25 |
| SET11(1010) | 3.50 |
| SET12(1011) | 3.75 |
| SET13(1100) | 4.00 |
| SET14(1101) | 4.25 |
| SET15(1110) | 4.50 |
| SET16(1111) | 4.75 |

Unnecessary power consumption drawn by the display device 101 may be prevented by sensing the load current C_load in real time and adjusting the intensity of the bias current C-bias according to the sensed result.

Figure 5:
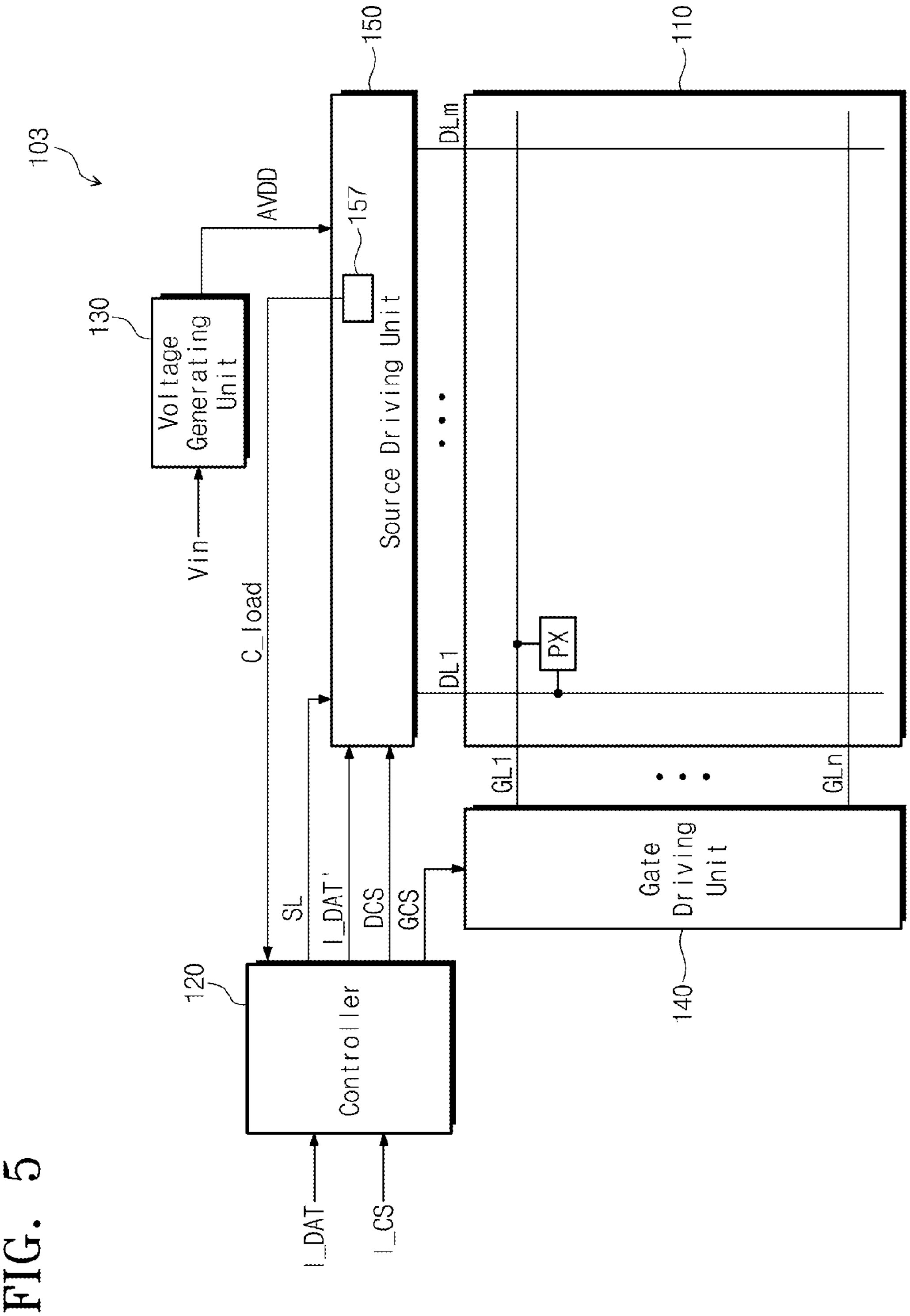
FIG. 5 is a block diagram of a display device according to another exemplary embodiment.
Figure 6:
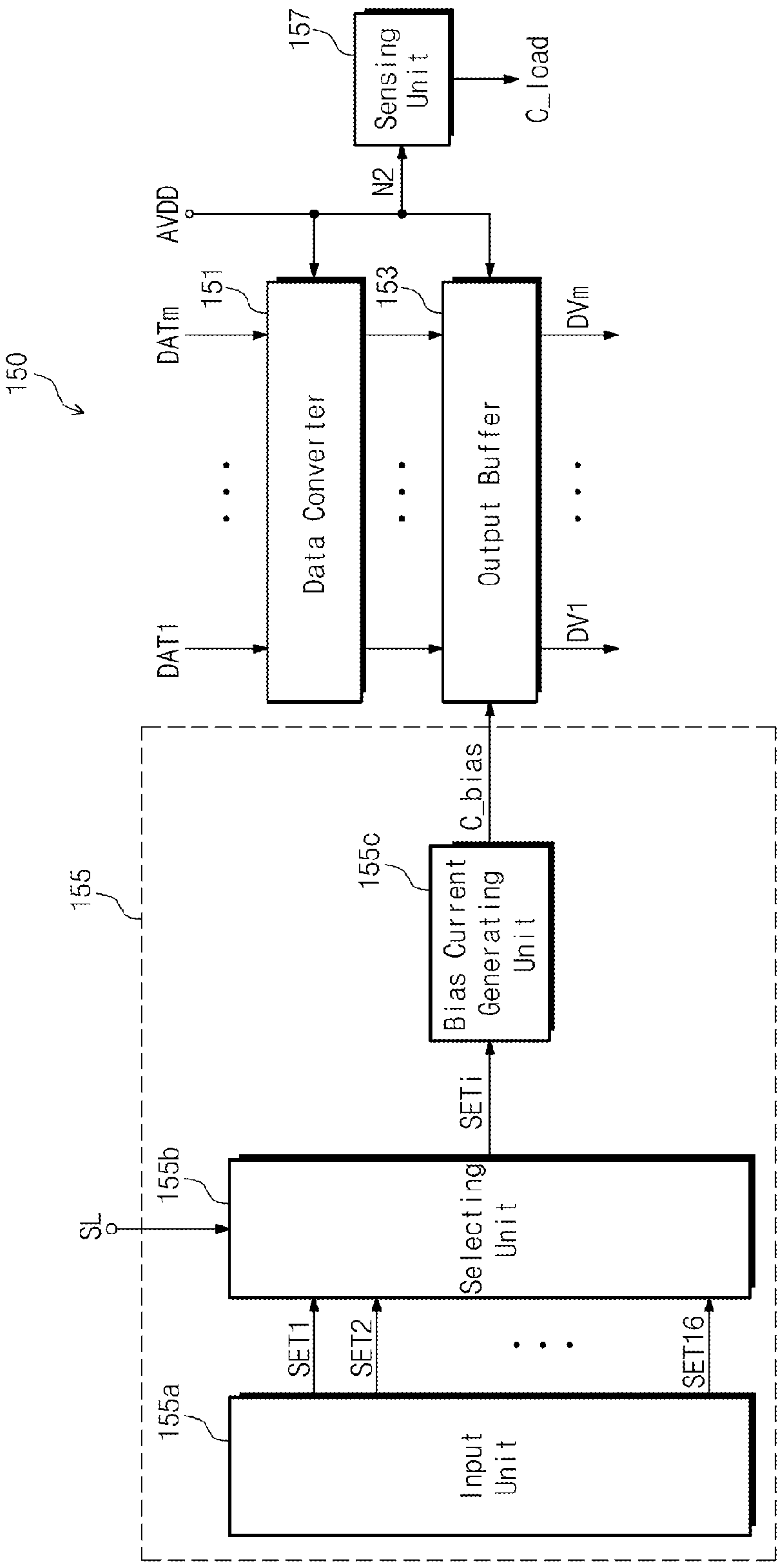
FIG. 6 is an internal block diagram of the source driving unit illustrated in FIG. 5.

FIG. 5 is a block diagram of a display device according to another embodiment. FIG. 6 is an internal block diagram of the source driving unit illustrated in FIG. 5. For brevity, the same elements of FIGS. 5 and 6 that exist in FIGS. 1-4 contain the same reference numerals but are not discussed with reference to FIGS. 5 and 6.

Referring FIGS. 5 and 6, a sensing unit 157 according to another embodiment may be included in the source driving unit 150 to sense a load current C_load. The sensing unit 157 may provide the sensed load current C_load to the controller 120.

As illustrated in FIG. 6, the sensing unit 157 may be connected to a second node N2 coupled to an input terminal through which the analog driving voltage AVDD is input in the source driving unit 150.

The source driving unit 150 may be formed of multiple driving chips or one driving chip. When the source driving unit 150 is formed of multiple driving chips, the sensing unit 157 may be built in each of the driving chips to sense respective load currents of driving chips and provide the load currents to the controller 120. In this case, the controller 120 may create the selection signal SL on the basis of the average value of the load currents.

Figure 7:
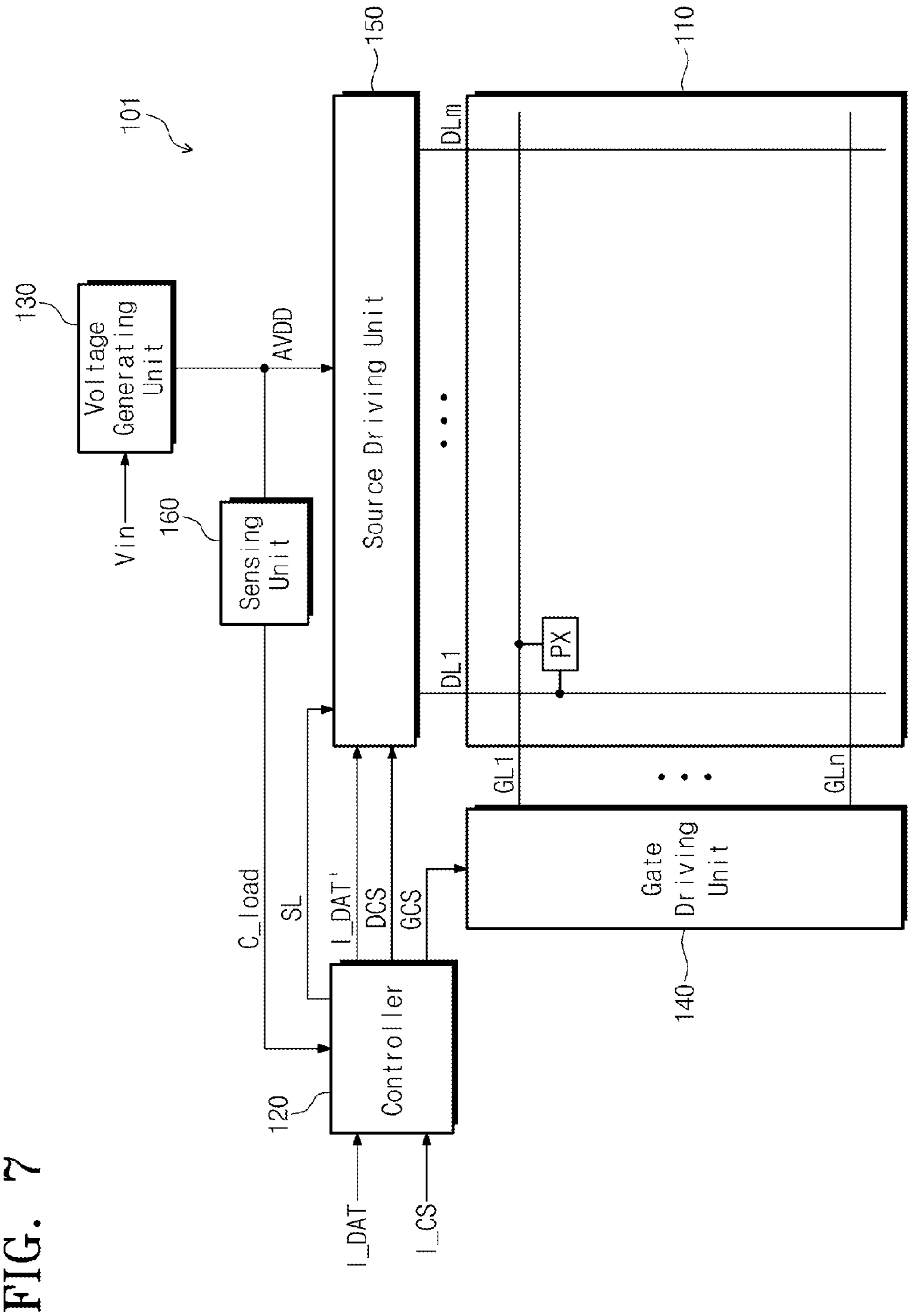
FIG. 7 is a block diagram of a display device according to another exemplary embodiment.

FIG. 7 is a block diagram of a display device according to another embodiment. For brevity, the same elements of FIG. 7 that exist in FIG. 1 contain the same reference numerals but are not discussed with reference to FIG. 7.

Referring to FIG. 7, a sensing unit 160 according to another embodiment may be provided as a separate chip from the voltage generating unit 130, the source driving unit 150, and the controller 120. In this case, the sensing unit 160 may be connected between an output terminal of the voltage generating unit 130 and a analog driving voltage input terminal of the source driving unit 150 to sense the load current C_load.

Although not illustrated in the drawing, the sensing unit 160 may be included in the controller 120.

As discussed above, the sensing units 135, 157, and 160 may be included in the display device 101 in various types to sense the load current C_load in real time. By adjusting the intensity of the bias current C-bias according to the sensing results of the sensing units 135, 157, and 160, unnecessary power consumption may be prevented when driving the display device 101.

According to embodiments of the present disclosure, total power consumption can be reduced by sensing a load current in real time, adjusting the intensity of a bias current according to the sensed result, and preventing unnecessary power from being consumed for driving a display device.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device, comprising:

a voltage generator configured to convert an input voltage into an analog driving voltage;

a controller configured to receive input image data and an image control signal and generate custom image data and a data control signal;

a source driver configured to receive the analog driving voltage and convert the custom image data into data voltages in response to the data control signal;

a sensor configured to sense a load current, wherein the sensor is connected to one point on a path through which the input voltage is converted into the analog driving voltage to be provided to the source driver; and a display panel configured to receive the data voltages to display an image, wherein the controller receives the sensed load current and generates a selection signal according to a first intensity of the load current.

2. The display device of claim 1, wherein the source driver comprises:

a data converter configured to convert the custom image data into one line amount of data voltages;

an output buffer configured to store the data voltages for a predetermined time and simultaneously output the data voltages to the display panel; and a bias current controller configured to receive the selection signal from the controller to adjust a second intensity of a bias current provided to the output buffer.

3. The display device of claim 2, wherein the second intensity of the bias current corresponds to the first intensity of the load current.

4. The display device of claim 2, wherein the bias current controller comprises:

a receiver configured to receive multiple bias current control signals;

a selector configured to select one bias current control signal from among the bias current control signals based on the selection signal; and a bias current generator configured to generate the bias current based on the selected bias current control signal and provide the generated bias current to the output buffer.

5. The display device of claim 2, wherein each bias current control signal is an n bit signal and the number of the bias current control signals is $2^n$.

6. The display device of claim 1, wherein the first intensity of the load current corresponds to a power consumed by the source driving unit.

7. The display device of claim 1, wherein the source driver comprises an input terminal through which the analog driving voltage is received.

8. The display device of claim 7, wherein the source driver comprises the sensor and the sensor is connected to the input terminal to sense the load current.

9. The display device of claim 1, wherein the source driver comprises one driving chip.

10. The display device of claim 1, wherein the source driver comprises multiple driving chips and the sensor is built in each of the multiple driving chips to sense respective load currents of the multiple driving chips.

11. The display device of claim 10, wherein the controller generates the selection signal based on an average value of the load currents.

12. The display device of claim 1, wherein the sensor is formed as a separate chip from the voltage generator, the source driver, and the controller.

13. The display device of claim 12, wherein the sensor is connected between an output terminal of the voltage generator and an analog driving voltage input terminal of the source driver.

14. A display device, comprising:

a voltage generator configured to convert an input voltage into an analog driving voltage;

a controller configured to receive input image data and an image control signal and generate custom image data and a data control signal;

a source driver configured to receive the analog driving voltage and convert the custom image data into data voltages in response to the data control signal;

a sensor configured to sense a load current, wherein the sensor is connected to one point on a path through which the input voltage is converted into the analog driving voltage to be provided to the source driver; and a display panel configured to receive the data voltages to display an image, wherein the controller receives the sensed load current and generates a selection signal according to a first intensity of the load current, and wherein the voltage generator comprises:

a coil with one end connected to an input terminal through which the input voltage is input and another end connected to a first node;

a diode comprising an anode connected to the first node and a cathode connected to an output terminal through which the analog driving voltage is output; and a transistor comprising a gate receiving a switching signal from the controller, a drain connected to the first node, and a source connected to a ground terminal through a first resistor.

15. The display device of claim 14, wherein the voltage generator comprises the sensor and the sensor is connected to the first node to sense the load current.

* * * * *